INVENTORS.
MIKE L. HARTMANGRUBER
LOUIS J. HARTMANGRUBER
BY Wayland D Keith
THEIR AGENT

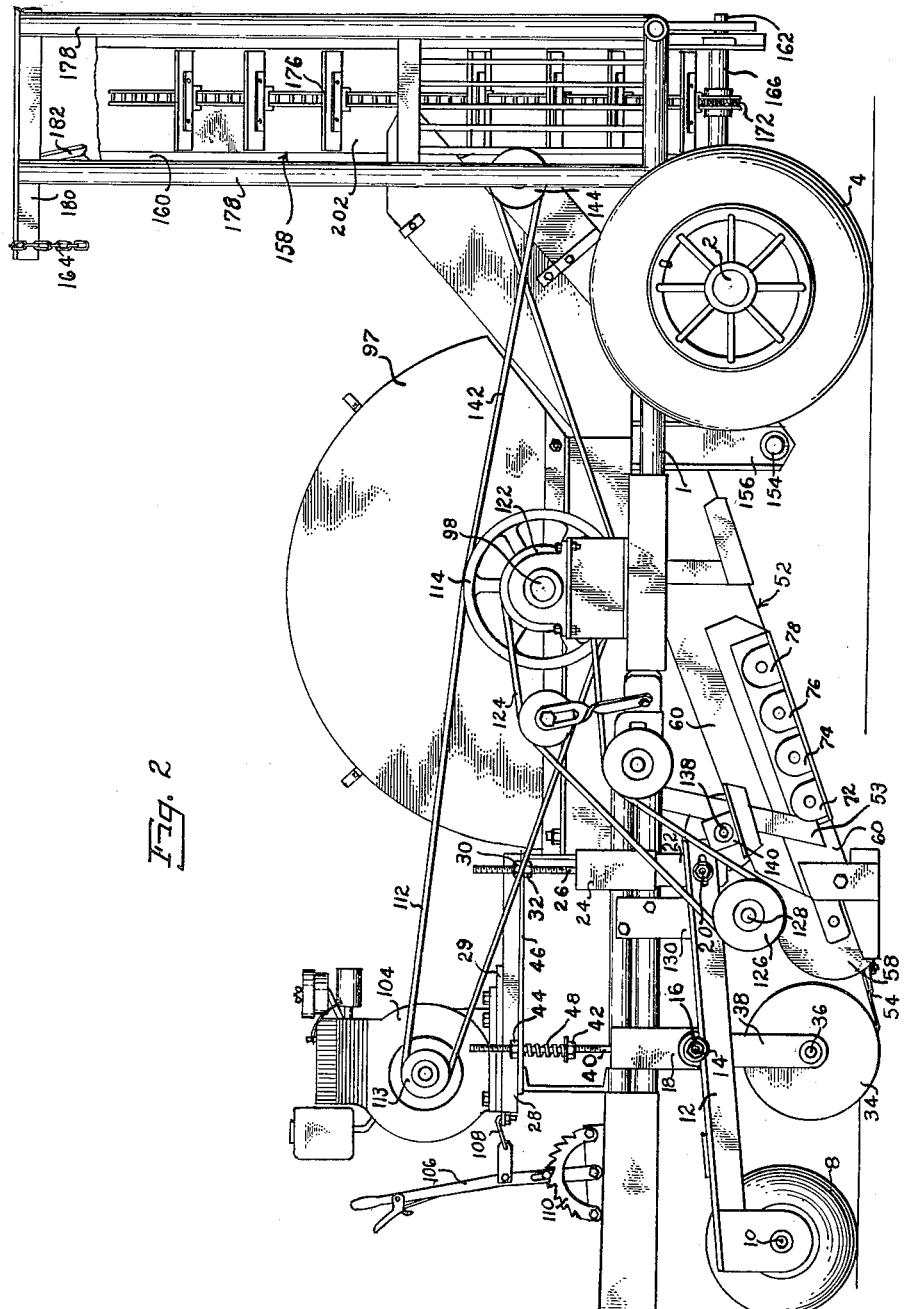

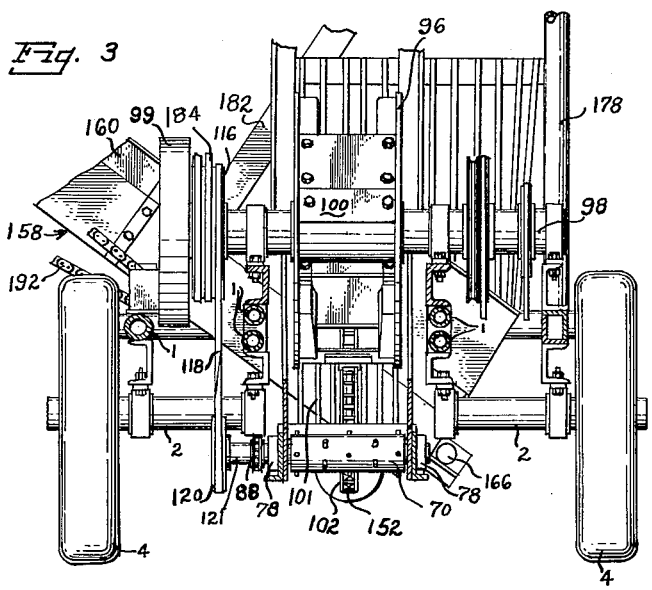
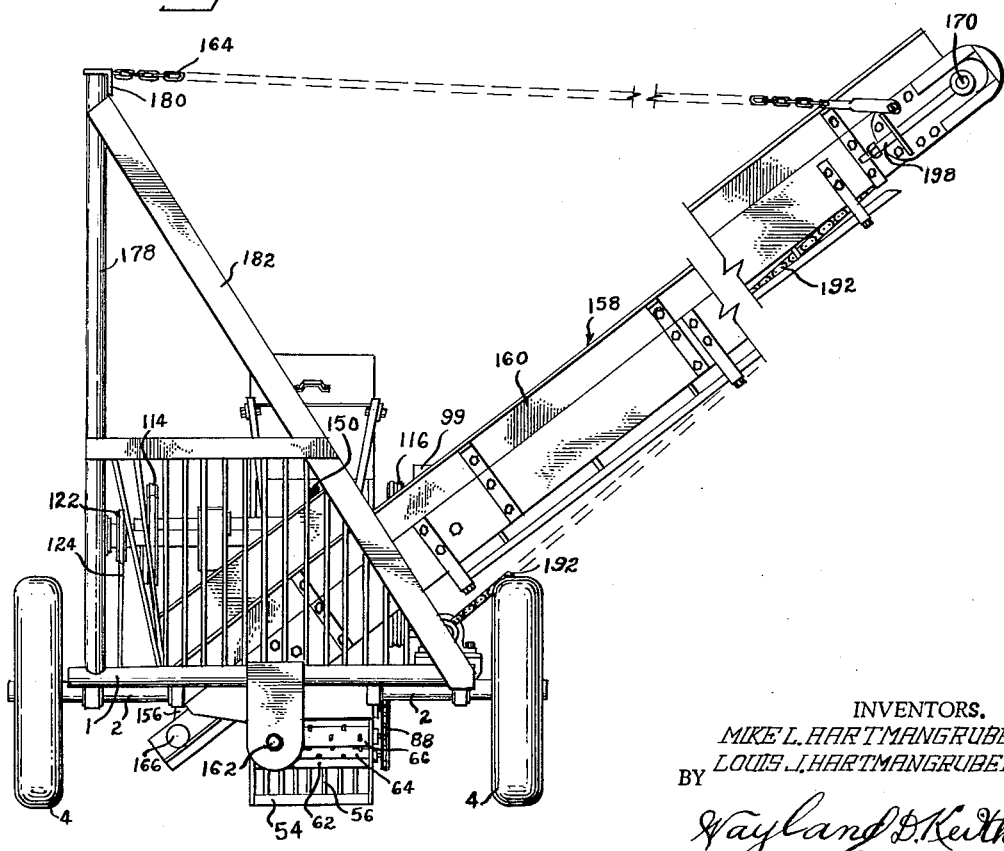

Aug. 29, 1961  M. L. HARTMANGRUBER ET AL  2,998,081
SOD HARVESTING MACHINES
Filed July 19, 1957  4 Sheets-Sheet 4
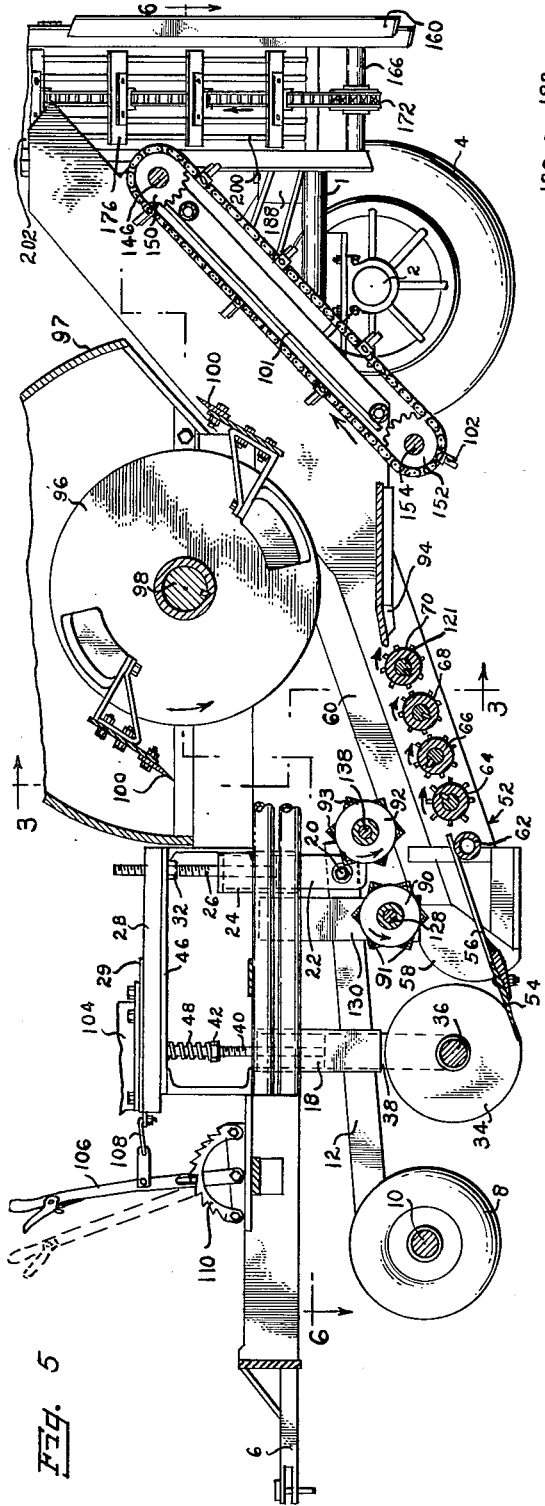
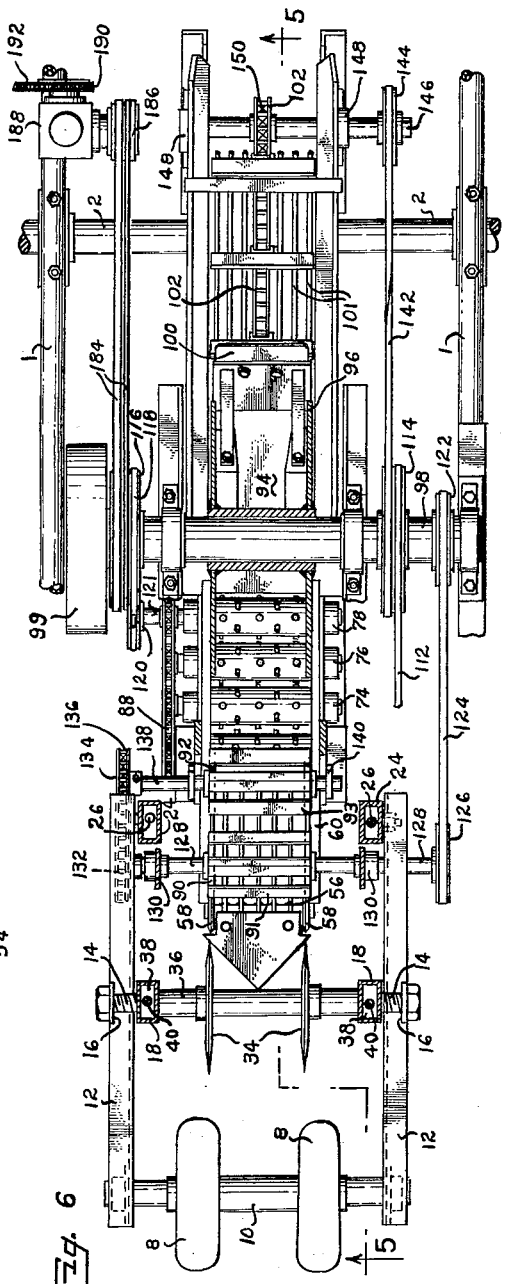
INVENTORS.
MIKE L. HARTMANGRUBER
LOUIS J. HARTMANGRUBER
BY
*Wayland D. Keith*
THEIR AGENT

United States Patent Office 2,998,081
Patented Aug. 29, 1961

2,998,081
SOD HARVESTING MACHINES
Mike L. Hartmangruber and Louis J. Hartmangruber, both of Rte. 1, Iowa Park, Tex.
Filed July 19, 1957, Ser. No. 672,975
3 Claims. (Cl. 172—20)

This invention relates to improvements in grass sod harvesting machines, and more particularly to grass sod harvesting machines for cutting Bermuda grass sod and the like, chopping this into small blocks or sprigs to be used in sodding meadows and the like.

The present device is so constructed that a single operation cuts sod to the desired depth, at a speed suitable for such operation, cuts it into pieces of suitable size for resetting and conveys the cut "blocks" to a vehicle for transportation or the like.

An object of this invention is to provide a machine that will cut strips of sod from the ground covered with turf, cut such strips into suitable lengths, and convey the cut sod into a truck or other receptacle being driven alongside the sod cutter, for transporting to a place of resetting, or the like.

Another object of the invention is to provide a machine which will cut sod of varying thicknesses.

Still another object of the invention is to provide a sod cutting or harvesting machine, which has a self-contained power unit for driving the machinery at the desired rate of speed, independent of the speed of the tractor pulling the device.

Still a further object of the invention is to provide a machine which is constructed for maximum safety.

Yet another object of the invention is to provide a machine that is simple in construction, easy to operate, and which has a minimum of working parts, to get out of order, as compared with the multiple operations it performs.

With these objects in mind, and others which will become manifest as the description proceeds, reference is to be had to the accompanying drawings in which like reference characters designate like parts in the several views thereof, in which:

FIG. 2 is a side elevational view of the machine with parts broken away, to better illustrate the details of construction;

FIG. 3 is a sectional view taken on the line 3—3 of FIG. 5, looking in the direction indicated by the arrows;

FIG. 4 is a rear elevational view of the device, with parts broken away and shortened, to bring out the details of construction;

FIG. 5 is a longitudinal, sectional view taken on the line 5—5 of FIG. 6, looking in the direction indicated by the arrows; and FIG. 6 is a sectional view taken substantially along the line 6—6 of FIG. 5, looking in the direction indicated by the arrows.

Figure 1:
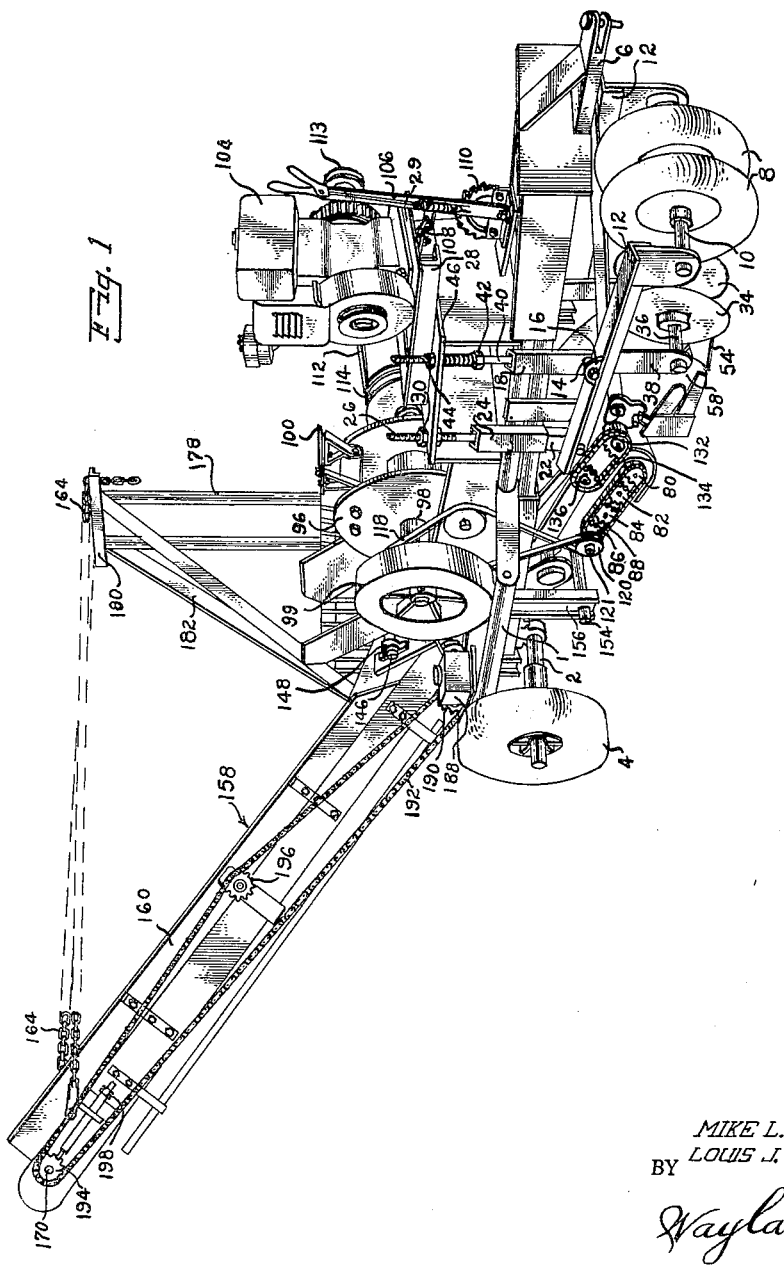
FIG. 1 is a perspective view taken from the front and a side, and looking downward onto the sod harvesting machine.

With more detailed reference to the drawings, the numeral 1 designates generally the frame of the machine, which may be of tubular construction or the like. An axle 2 is positioned transversely across the frame 1, near the rear end thereof, which axle has wheels 4 journaled thereon, and which wheels support the rear end of the machine. The frame 1 extends forward and has a draw bar 6 attached to the forward end thereof, which draw bar may be attached to a mechanical or hydraulic lift of a tractor, for raising or lowering the front end of the sod harvesting machine. A pair of depth gauge wheels 8 are mounted for turning action about a front axle 10.

The front axle 10 is supported on the forward ends of a pair of cantilever beams 12, which beams are pivoted on pivot bolts 14. The pivot bolts 14 are mounted on and extend outward from the tubular members 18, and pass through the respective lugs 16. The upright tubular members 18 are secured, one on each side of the frame 1 in such manner as to form a rigid connection therewith.

The rear end of each cantilever beam 12 is pivotally secured, by a pivot bolt 20, to a member 22. The members 22 are slidably mounted in the respective tubular members 24, which tubular members 24 are squared and are also mounted on and secured to the frame 1, as by welding.

A threaded rod 26 is secured to the upper end of each sliding member 22, which rods 26 are threaded at the respective upper ends, and extend upwardly through plate 46 on the engine support base 28. Nuts 30 and 32 are screw threaded onto and engage opposite sides of the engine support base 28. Therefore, by loosening one pair of nuts 30 or 32, and tightening the other pair of nuts, the slide members 22 are made to move up or down in squared tubular members 24, which will cause the cantilever beams 12 to pivot about pivot bolts 14 to raise or lower the depth gauge wheels 8.

A pair of discs 34 is mounted in spaced apart relation on a transverse shaft 36, immediately rearward of gauge wheels 8, each end of which shaft is mounted on slide members 38, which members 38 slide in the respective squared tubular members 18.

A rod 40, which is threaded at its upper end, is secured to the upper end of each slide member 38, and extends upwardly. Each rod 40 has nuts 42 and 44 thereon, with the nuts 44 being immediately above plate 46 of the engine support base 28. A spring 48 is positioned below plate 46 and above nuts 42, so upon moving nuts 42 and 44 along threaded rods 40, various spring tensions may be applied to discs 34, the nut 44 limiting the downward movement of rod 40 and discs 34, thereby determining the depth at which the discs 34 are allowed to cut.

An elevator chute, designated generally by the numeral 52, has a brace 53 secured to each side thereof, which braces extend upward and are secured to the frame 1. The chute 52 extends upwardly at an angle from a point immediately rearward of discs 34. A plow 54 is secured to the lower end of the chute 52 and has rods 56 extending upward therefrom at an angle, so as to allow the sod being cut to slide over the plow. The plow 54 is slightly wider than the space between the vertical discs 34. The chute 52 has an upstanding knife 58 on each side thereof, in alignment with and rearward of the respective discs 34, which knives join with the respective, upwardly extending walls 60 which form the sides of the chute, as will best be seen in FIGS. 2, 5, and 6.

The rear ends of the bars 56 are supported by a transverse support member on the chute 52, as indicated at 62, which bars 56 are welded thereto.

Immediately rearward of the bars 56 is a series of spiked rollers, which are designated at 64, 66, 68 and 70, respectively, and which rollers are journaled at each end on the respective bearings 72, 74, 76, and 78. One end of the shaft of each of the rollers extends outward, and each shaft has a sprocket thereon, as indicated at 80, 82, 84, and 86, respectively, which sprockets are in mesh with a common roller chain, designated by the numeral 88, so that the chain 88 will rotate the rollers 64, 66, 68 and 70 in the same direction.

A pair of presser rollers 90 and 92 is provided, the roller 90 being mounted on shaft 128 and the roller 92 being mounted on shaft 138, which shafts are mounted in bearings 130 and 140 secured to the frame 1 and to the upstanding wall 60, so as to hold the sod in engagement with the bars 56 and spiked rollers 64 through 70, so a ribbon of sod will be conveyed upward from plow 54, after it has been cut by the plow 54, discs 34 and knives 58. As the sod is discharged off the spiked roller 70 onto shear block 94, a drum carrying knives 100, and which is mounted on shaft 98, is rotated so that the knives 100 will rotate at a speed which will bring the knives into close shearing action with shear block 94, so as to shear the sod from the ribbon of sod traveling upward along spiked rollers 64—70, whereupon the sheared pieces will be moved by the knives 100 onto conveyor chain 102, to be discharged therefrom.

A power plant 104 is mounted on engine base 29 to drive the mechanism of the sod harvesting machine. A lever 106 is connected by linkage 108 to the base of the engine or power plant 104, so as to move the engine back and forth along the engine support base 28. When the engine 104 is in the desired position, a pawl on lever 106 will engage segmental notches on rack 110 to hold the engine 104 in adjusted relation, so as to enable the driving thereof through belt 112, thereby providing a simple form of clutching arrangement. A pulley 114 is mounted on and secured to shaft 98 for turning the shaft 98, thereby driving the various mechanisms of the machine. The pulley 114 causes the rotation of shaft 98 to drive drum 96 which carries knives 100. The shaft 98 has a pulley 116 on the opposite side of the machine, which pulley 116 has a belt 118 leading downward over a pulley 120, which pulley is mounted on the outer end of shaft 121, on which spiked roller 70 is mounted. The belt 118 is twisted, so as to drive the rollers in a direction so that the top of the respective spiked rollers 64—70, will urge the sod upward long the conveyor chute 52 into the path of rotating blades 100, which are mounted on drum 96.

A further pulley 122 is mounted on shaft 98, on the same side of the machine as pulley 114, and is spaced outwardly therefrom, and has a belt 124 extending thereover, which belt extends downward over pulley 126 mounted on shaft 128. The shaft 128 is journaled in bearings 130, which bearings are supported on frame 1. The presser roller 90 is mounted on and secured to shaft 128 and rotates therewith. The end of the shaft 128 opposite pulley 126, has a sprocket 132 secured thereto.

A chain 134 passes around sprocket 132 and around a sprocket 136, mounted on shaft 138. The shaft 138 is journaled in bearings 140 on each of the upwardly extending walls 60 of the chute 52.

The presser roller 92 is mounted on and secured to shaft 138. The chain 134 surrounds sprockets 132 and 136, so as to rotate the presser rollers 90 and 92 in the direction opposite from the direction of rotation of the spiked rollers 64, 66, 68 and 70. In this manner the rollers 90 and 92 press down upon the top of the ribbon of sod, and the ribbed, angle faces 91 and 93, of the respective rollers 90 and 92, will urge the sod upward in a uniform manner along the chute 52.

A twisted belt 142 surrounds pulley 114 and extends rearward to drive the pulley 144, which pulley 144 is mounted at the upper end of the conveyor chain 102. The pulley 144 is mounted on a shaft 146, which shaft is journaled on bearings 148 near the upper end of chute 52. The shaft 146 has a sprocket 150 mounted thereon, over which conveyor chain 102 passes, which chain passes downward around sprocket 152 which is mounted on shaft 154 at the lower end of the conveyor chain 102. The shaft 154 is journaled in downwardly extending support bars 156, which bars are secured to the frame 1, as will best be seen in FIG. 2.

A second elevator, designated generally at 158, has the lower end thereof positioned below the discharge end of conveyor chain 102, which conveyor 158 comprises a conveyor chute 160 which is pivotally mounted at its lower end on a shaft 162, to permit the raising and lowering of the discharge end thereof by chains 164. A shaft 166 is journaled in the lower end of conveyor chute 160 and extends upwardly and has a shaft 170 journaled in the upper end. A sprocket 172 on the lower end and a similar sprocket (not shown) on the upper end, are mounted on the respective elevator shafts so as to provide driving action for elevator chain 176. A pair of upright support members 178 are secured to and extend upwardly from the rear end of frame 1, and are provided with a link engaging angle 180, so as to enable the chains 164 to be adjusted to the proper length to elevate the discharge end of the conveyor 158. Braces 182 are provided between the upper ends of upright members 178 and the frame 1, so as to maintain the uprights 178 in upstanding relation.

Belts 184, as will best be seen in FIG. 6, pass over pulley 116 and pulley 186, which pulley 186 is on bevel gear drive unit 188, so as to drive a sprocket 190, which sprocket drives through chain 192 to a sprocket 194, which sprocket 194 is mounted on shaft 170, which shaft is journaled on the upper end of conveyor 158. An idler sprocket 196 is provided within the length of chain 192, so as to enable the chain to be adjusted to the correct tightness. A further adjustment is provided by screw bolt adjusting means 198 which moves the shaft 170 longitudinally of the conveyor 158. It is to be pointed out that the lower portion of the bottom of the conveyor chute 160 is formed of rods 200 which are positioned longitudinally therein, so the loose dirt will be sifted out, as the sod passes thereover. The upper portion of the chute bottom is closed, as indicated at 202. This enables the sod to be delivered, in pieces of the desired size, into a truck or other receptacle, that is being moved along-side the machine as it is pulled across the terrain.

As previously pointed out, the drum, the elevators and associated mechanism of the machine, may be run at any desired speed, independently of the speed of the traction element. Therefore, if it is desired to cut the sod into large pieces, the mechanism of the machine is run more slowly, however, if smaller pieces of sod or sprigs are desired, the mechanism of the machine may be run at a higher rate of speed, even though the machine is towed over the terrain at a slower speed. In so doing, the high speed operation of the knives 100 and of the conveyor chains 102 and 176, will cause most of the dirt to become loosened from the grass roots of the sod, which dirt will sift out through bars 56, 101 and 200, thereby delivering small pieces of sod or sprigs of grass to be discharged from the end of the conveyor into a truck or the like.

Operation

When an operation is to be performed, such as cutting sod from Bermuda turf, or the like, the sod cutting machine is attached, by means of a draw bar 6, to the hydraulic or mechanical lift of a tow vehicle, such as a tractor (not shown). The depth gauge wheels 8 of the sod cutting machine may be raised or lowered by means of screw elements 26 by manipulation of nuts 30 and 32. When the depth gauge wheels 8 are the desired spaced distance above the ground, that is the thickness at which the sod is to be cut, the nuts 30 and 32 are locked against plates 46 which are secured to the engine support 28. The motor 104 of the sod cutting machine may then be started, and by moving the tractor, to which the draw bar 6 is connected, forward, the discs 34 and plow 54 will cut into the ground until the weight of the front end of the machine is supported on depth gauge wheels 8.

A lever 106 is pivotally mounted on frame 1 and one end of a link 108 is pivotally connected thereto. The other end of the link 108 is connected to slidable engine base 29, as will best be seen in FIGS. 1, 2 and 5. To start the machine elements of the sod cutter to operating, the lever 106 is moved forward, which in turn moves slidable engine base 29 and engine 104 forward a sufficient distance to tighten belt 112 which surrounds pulleys 113 and 114, and with the engine 104 moved to this position, a pawl on lever 106 will engage in a serration of ratchet member 110, so as to hold the lever in the position as indicated in dashed outline in FIG. 5.

The engine 104 will then drive through belt 112 to drive pulley 114 which is mounted on and secured to shaft 98. Belts 118 and 124 are provided to surround pulleys 116 and 122 on shaft 98 and to surround pulleys 120 and 126, respectively, so upon rotation of shaft 98, the respective pulleys 120 and 126 will be rotated. The pulley 120 is mounted on a shaft 121 and rotates the shaft so as to drive sprocket 86 and spiked roller 70. The roller 70, as well as rollers 64, 66, and 68 are driven in the direction indicated by the arrows in FIG. 5, by the respective sprockets 86, 80, 82, and 84, which sprockets are surrounded by a drive chain 88.

As the sod harvester moves forward, the discs 34 cut a ribbon of a defined width and at a gauged depth, which depth is determined by the depth at which the plow 54 is set to pass beneath the sod, whereupon the sod is pushed upward along the plow 54, rods 56, which are mounted in longitudinal relation with the movement of the sod, and with the compressor rollers 90 and 92 pressed down on top of the sod, which rollers are rotating in the direction indicated by the arrows in FIG. 5, the sod is moved onto rollers 64, 66, 68, and 70, which will convey the sod toward the shear plate 94. With the shaft 98 running, in the direction indicated by the arrows in FIG. 5, the knives 100, which are mounted on drum 96, will cut the sod into the desired lengths, depending upon the speed of the engine 104, which cut lengths of sod are deposited onto the conveyor chain 102.

With the conveyor chain 102 running in the direction indicated by the arrows in FIG. 5, the pieces of sod are moved upward and rearward along the chain, as the chain is driven from pulley 114 through belt 142 to drive pulley 144 on shaft 146, which rotates the conveyor chain 102, whereupon the pieces of sod are discharged off the upper end of the chain onto the conveyor chain 176. The conveyor chain 176 is driven by pulleys 116 to drive belt 184 and pulley 186 which drives through right angle gear drive 188 to drive sprocket 190, which sprocket 190 in turn drives through chain 192 to drive sprocket 194 which is secured to shaft 170. The shaft 170 has a sprocket mounted thereon to drive conveyor chain 176, and with one end of the conveyor 158 elevated to the desired height by adjustment of chains 164 interengaging slots within angle 180, the sod will be directed up chain 176 into a trailer, truck or the like which is being driven alongside the sod harvesting machine.

The speed of the engine 104 determines the speed of drum 96 carrying knives 100, however, if desired, the engine can be run at a higher rate of speed, thereby cutting the sod into smaller pieces or practically shredding the turf into small sprigs, if it is sprigs that are wanted for resetting. With the elevator chains 102 and 176 running at a high rate of speed, as are the feed rollers 90 and 92 and spiked rollers 64—70, the greater part of the dirt is removed from the sod, the end result being sprigs of grass, since the dirt sifts downward through bars 56, 101 and 200.

The discs 34 are spring pressed by springs 48 which are positioned on the respective threaded rods 40, the tension of the springs being adjusted by means of threaded nuts 44, thereby limiting the downward movement of the projections or slide members 38, which slide within channel members 18. The positioning of nut 42 determines the tension on springs 48.

A flywheel 99 is provided on shaft 98, so as to insure even turning of the drum 96 which carries cutting blades or knives 100, thereby giving smoothness to the operation of cutting pieces of sod from the ribbon of sod being fed upward onto shear plate 94.

A hood 97 is provided over drum 96 so as to minimize the danger of a person coming in contact with blades 100 while they are rotating. The cover also prevents flying objects, such as stones, from presenting a hazard to the operator, and the cover also minimizes or controls the dust which would normally rise from the operation of digging, conveying, cutting and discharging the pieces of sod.

Having thus clearly shown and described the invention, what is claimed as new and desired to secure by Letters Patent is:

1. A sod harvesting apparatus adapted to be drawn over the terrain by a traction element; which apparatus comprises a frame, an axle mounted transversely of said frame near the rear portion thereof, wheels mounted on said axle for rotation about the axis thereof, a pair of cantilever beams pivotally mounted near the forward end of said frame for pivotal movement about a common transverse axis, which beams extend in opposite directions from said common, transverse axis along said frame, a second transverse axle mounted on said frame near the forward ends of said beams, a pair of gauge wheels mounted on said second transverse axle for rotation about the axis thereof, an upright tubular member mounted on said frame near the rear end of each of said beams, a slide member pivotally connected to each of said beams and extending upward into the respective tubular members, a screw threaded member mounted on and secured to the upper end of each of said slide members and extending upward therefrom, means on said frame securing said screw threaded members in a predetermined, adjusted relation with respect to said upright, tubular members, a second pair of upright, tubular members secured to said frame intermediate said first mentioned wheels and said gauge wheels, a slide member mounted in each of said second upright, tubular members, a screw threaded member mounted on and secured to the upper end of each of said last mentioned slide members and extending upward therefrom, a spring mounting member mounted on and secured to said frame, a spring interposed in resilient relation between said spring mounting member and said last mentioned upstanding, screw threaded members said last mentioned screw threaded members being adjustable with respect to said spring mounting member for adjusting the tension of said spring with respect thereto, a third transverse shaft mounted on said last mentioned slides, a pair of discs mounted on said third transverse shaft, which discs are adapted to cut into the sod being harvested so as to define spaced apart vertical cuts, a plow mounted on said frame immediately rearward of said discs and being adapted to pass beneath the sod, so as to make a cut of such width as to intersect said vertical cuts made by said discs, said plow having an upward and rearwardly inclined upper surface, support elements mounted on said frame immediately rearward of said plow, a wall on each side of said supporting elements to define an upwardly inclined chute, a shear plate mounted rearward of said plow, at least one shear blade complementarily engaging said shear plate for cutting said sod into predetermined lengths, a conveyor immediately rearward of said shear plate for conveying said sheared pieces of sod rearward for discharge therefrom.

2. A sod harvesting apparatus as defined in claim 1, wherein a fourth transverse shaft is journaled on said frame intermediate said plow and the forward end of said conveyor so said shaft will be in a horizontal plane above said plow and the forward end of said conveyor, a pair of disc members mounted on said fourth transverse shaft and being spaced apart, support members mounted on each of said discs, at least two transverse bars positioned between said support members and attachably secured thereto, at least one shear blade attachably secured to each of said transverse bars and being in position to be rotated about the axis of said fourth transverse shaft.

3. A sod harvesting apparatus adapted to be moved over the terrain; which apparatus comprises a frame, a transverse axle mounted on said frame near the rear end thereof, wheels mounted on said axle for turning movement about the axis thereof, an adjustable wheel support member mounted on said frame near the forward end thereof, an axle mounted on said wheel support member, wheels mounted on said axle for rotation about the axis thereof, a ground engaging plow mounted rearwardly of said wheels mounted on the forward end of said frame, disc support means adjustably mounted on the forward end of said frame, a transverse shaft mounted on said disc support means, the axis of which shaft lies in a transverse plane intermediate said plow and said wheels mounted on the forward end of said frame, a pair of laterally spaced cutter discs mounted on said shaft, spaced apart rods mounted on said frame rearwardly of said plow, which rods extend upwardly and rearwardly from said plow, a pair of longitudinal, upstanding knives mounted on said frame rearward of the respective discs and in alignment therewith, one of said upstanding knives being on each side of said plow, which upstanding knives extend substantially to a depth at which said plow is adapted to cut, a transverse shear block mounted on said frame rearwardly of said upwardly and rearwardly extending rods, a transverse shaft journaled on said frame, a rotary cutter drum mounted on said transverse shaft journaled on said frame, power means connected in driving relation with said shaft mounting said rotary cutter drum, at least two knives mounted on said rotary cutter drum, which knives are adapted to move in shearing relation with said shear block when rotated in one direction, a pair of spaced apart shafts journaled on said frame rearwardly of said shear block, a conveyor drive wheel on each of the shafts of said pair of shafts, an endless conveyor member surrounding said conveyor wheels so as to extend upwardly from the conveyor shaft adjacent said shear block, and said power means also being connected in driving relation with said conveyor member to move sod upward from said shear block.

References Cited in the file of this patent

UNITED STATES PATENTS

| | | |
|---|---|---|
| 41,371 | Foley | Jan. 26, 1864 |
| 1,578,859 | Snider | Mar. 30, 1926 |
| 1,830,245 | Rowe | Nov. 3, 1931 |
| 2,401,653 | Mohler | June 4, 1946 |
| 2,617,347 | Provost | Nov. 11, 1952 |
| 2,663,242 | Lancaster | Dec. 22, 1953 |
| 2,740,211 | Henry et al. | Apr. 3, 1956 |
| 2,756,661 | Frisbie | July 31, 1956 |
| 2,788,725 | Wilkey et al. | Apr. 16, 1957 |